United States Patent
Welker-Muraguri et al.

(10) Patent No.: US 9,479,651 B1
(45) Date of Patent: Oct. 25, 2016

(54) MANAGEMENT AND DISSEMINATION OF INFORMATION FROM A CONTROLLED-ENVIRONMENT FACILITY

(71) Applicant: Securus Technologies, Inc., Dallas, TX (US)

(72) Inventors: Katie Welker-Muraguri, Plano, TX (US); Luke Keiser, Frisco, TX (US); Matthew Smith, McKinney, TX (US)

(73) Assignee: SECURUS TECHNOLOGIES, INC., Dallas, TX (US)

( * ) Notice: Subject to any disclaimer, the term of this patent is extended or adjusted under 35 U.S.C. 154(b) by 0 days.

(21) Appl. No.: 14/580,688

(22) Filed: Dec. 23, 2014

Related U.S. Application Data

(63) Continuation-in-part of application No. 14/196,162, filed on Mar. 4, 2014, now Pat. No. 9,055,167, and a continuation-in-part of application No. 14/322,856, filed on Jul. 2, 2014.

(51) Int. Cl.
*H04M 15/00* (2006.01)
*H04M 15/08* (2006.01)
*H04M 3/22* (2006.01)

(52) U.S. Cl.
CPC ........... *H04M 15/08* (2013.01); *H04M 3/2281* (2013.01)

(58) Field of Classification Search
CPC ............. H04M 3/42; H04M 2201/50; H04M 2203/652; H04M 3/42059; H04M 3/42365
USPC .................. 379/114.21, 114.23, 144.01, 188
See application file for complete search history.

(56) References Cited

U.S. PATENT DOCUMENTS

| | | | |
|---|---|---|---|
| 7,158,621 B2 | 1/2007 | Bayne | |
| 7,519,169 B1 * | 4/2009 | Hingoranee | H04M 3/42068 379/114.13 |
| 7,529,357 B1 | 5/2009 | Rae et al. | |
| 2007/0041545 A1 | 2/2007 | Gainsboro | |
| 2007/0047694 A1 | 3/2007 | Bouchard et al. | |
| 2008/0088437 A1 * | 4/2008 | Aninye | G07C 9/00111 340/539.13 |
| 2009/0228383 A1 | 9/2009 | Matinez et al. | |
| 2011/0110367 A1 | 5/2011 | Rae et al. | |
| 2011/0317685 A1 | 12/2011 | Torgersrud et al. | |
| 2013/0058469 A1 | 3/2013 | Gongware et al. | |
| 2014/0287715 A1 | 9/2014 | Hodge et al. | |
| 2014/0361899 A1 * | 12/2014 | Layson | G08B 21/18 340/573.4 |
| 2015/0149220 A1 * | 5/2015 | Omar | G06Q 30/016 705/5 |

* cited by examiner

*Primary Examiner* — Quoc D Tran
(74) *Attorney, Agent, or Firm* — Fogarty, L.L.C.

(57) ABSTRACT

Systems and methods for dissemination of information from a controlled-environment facility may offer a non-resident and/or resident an option to subscribe to notifications about a particular resident of a controlled-environment facility and/or notifications about the controlled-environment facility. Identification and contact information may be accepted from the non-resident to establish the non-resident as a paid or non-paid subscriber to notifications about the resident and/or the controlled-environment facility. A determination may be made, or an indication may be received from a controlled-environment facility administration and management system, when information about the resident hosted by the controlled-environment administration and management system changes and/or when a change is made to information about the controlled-environment facility. As a result, the subscriber is contacted and notified of the change(s).

24 Claims, 5 Drawing Sheets

MANAGEMENT AND DISSEMINATION OF INFORMATION FROM A CONTROLLED-ENVIRONMENT FACILITY

CROSS-REFERENCE TO RELATED APPLICATION

This is a continuation in part of U.S. patent application Ser. No. 14/196,162, also entitled Management and Dissemination of Information from a Controlled-Environment Facility, filed Mar. 4, 2014, which issued as U.S. Pat. No. 9,055,167 on Jun. 9, 2015, and of U.S. patent application Ser. No. 14/322,856, entitled Controlled-Environment Facility Interactive Voice Response System Functionality Facilitating Repetition of a Last Requested Action filed Jul. 2, 2014, both of which are incorporated herein by reference.

TECHNICAL FIELD

This specification relates generally to telecommunications systems, and, more particularly, to systems and methods for management and dissemination of information from a controlled-environment facility.

BACKGROUND

The following discussion sets forth the inventors' own knowledge of certain technologies and/or problems associated therewith. Accordingly, this discussion is not an admission of prior art, and it is not an admission of the knowledge available to a person of ordinary skill in the art.

Management and dissemination of information are typically at the forefront of the administrative burdens for controlled-environment facilities. Controlled-environment facilities, as used herein, may include inmate facilities (e.g., municipal jails, county jails, state prisons, federal prisons, military stockades, juvenile facilities, and detention camps), or hospitals, nursing homes, camps, schools, and the like. An example of the aforementioned administrative burden in a correctional institution or detainment facility such as a county or municipal jail might arise when an individual is booked in as an inmate of the facility and questions are directed to that facility from friends, family, attorneys, and the like. Typically, a great number of questions, commonly from a number of telephone calls or visits, are directed to the facility's booking personnel asking for details related to the newly booked inmate and his circumstances. However, controlled-environment facilities, particularly inmate facilities, may wish to avoid contact with friends and family members, because in many cases these friends or family members are emotional, and the facility administrators may wish to avoid conflict. Similarly, information about the facility, such as visitation hours, location and the like, is constantly being sought by the public, friends and family of residents, or the like. Typically, controlled-environment facilities do not employ automated information systems or the like. Additionally, scheduling visitation from friends, family and others, use of commissary facilities, and the like, raise other administrative functions to burden the facility. Managing transactions within a jail or the like, such as commissary deposits, medical payments, connecting with bail bondsmen, scheduling meetings and court dates with an attorney, and the like become tedious tasks for facility administrators.

Controlled-environment facilities may have goods and service providers or service professionals registered or otherwise eligible to provide goods or services to residents of the facility. Examples of such service providers or professionals may include attorneys, bail bondsmen, and the like, registered or eligible to provide services to the residents of a municipal or county jail. It may be problematic for such professionals to be notified of the intake of new residents that may require the goods or services of the professional. Regardless, such professionals typically need to communicate with the jail to obtain information about clients and potential clients, as performance of services dictate. Typically, such professionals or service providers must place a telephone call to the facility to obtain information and/or such information must be obtained in person or through the mail. For example, in the case of a municipal or county jail, a bail bondsman might need to determine the charges against a suspect and any bond amounts or conditions that may have already been set. Attorneys may need similar information as well as information concerning court dates and the like. To obtain such information a professional might need to contact multiple parties. The dissemination of information to goods and service providers or service professionals may be a burden on the facility and obtaining this information may be time consuming for the provider or service professional.

As pointed out above, family members or friends typically desire information related to a resident of a controlled-environment facility. For example, when a relative calls to obtain information related to a person recently arrested, such as charges, opportunities for visitation, personal item needs and the like, they speak to a booking officer or similar personnel in the jail. The booking officer may direct the friend or family member to somebody else to obtain some of the requested information. Several calls may be required to gather the desired information. Thereafter, the family or friends of the detained party may need to look for professional assistance for the detainee. For example, the friends or family may seek out the services of a bail bondsman and/or attorney. This may require research or at least consultation of a telephone directory, advertisements, or the like. Typically, the friends or family members would then need to confer with the professional(s) to determine if the professional(s) may be of assistance in this particular case. If assistance is not available from that professional, due to technical or time constraints (i.e., the professional is not registered with the facility, does not handle the types of matters involved, has other obligations of his or her time, or the like), then the friends and family must continue their search for assistance. Such a process is quite time consuming, often requiring days to complete. However, service professionals, and the like, oftentimes depend on calls coming from residents of a facility, or from friends or family of these residents, seeking their services. Problematically, no mechanisms exist to aid a professional in offering their services, particularly where the friends or family may seek best value goods or professional services.

SUMMARY

Embodiments disclosed herein are directed to the management and dissemination of information from a controlled-environment facility. In an illustrative, non-limiting embodiment, a method may include receiving an identification of each of a plurality of non-residents of a controlled-environment facility with whom a resident of the controlled-environment facility is allowed to communicate; contacting a selected one of the plurality of non-residents; and during the contact, allowing the selected non-resident to establish or fund an account associated with the resident. For example, the controlled-environment facility may be a correctional facility and the resident may be a prisoner, inmate, detainee, or arrestee.

The method may further comprise storing the identification of the plurality of non-residents in a Personal Allowed Number (PAN) list or Pre-Approved Contact (PAC) list associated with the resident. In some cases, contacting the selected one of the plurality of non-residents may include employing an Interactive Voice Response (IVR) system, a text message, email, video message, or video mail. The identification may be provided by the resident, and it may include a name, a phone number, or an email address of each of the plurality of non-residents.

The method may also include identifying one or more of the plurality of the non-residents with whom the resident has not had communications and selecting one of the identified non-residents as the selected non-resident. The method may further include allowing the selected one of the plurality of non-residents to reach a bondsman or an attorney during the contact.

The method may also include providing information to the non-resident regarding the resident's status with respect to the controlled-environment facility or physical location within the controlled-environment facility during the contact. In some cases, the information may be provided in real-time. The method may further include providing information to the non-resident regarding the resident's medical or health-related status.

In another illustrative, non-limiting embodiment, a method may include receiving, from a resident of a controlled-environment facility, identification of a plurality of non-residents of the controlled-environment facility; determining, among the plurality of non-residents, a set of non-residents with whom the resident is allowed to communicate; contacting at least one non-resident from the set of non-residents; and providing information to the at least one non-resident during the contact about how to release the resident from the controlled-environment facility.

The information may include contact information for a bail bonds or legal service available to the resident. The bail bonds or legal service available to the resident may be different from another bail bonds or legal service available to another resident of the controlled-environment facility. The information may also include an automatic bonding offer made to the at least one non-resident.

The method may also include allowing the selected non-resident to establish or fund an account associated with the resident during the contact. The method may further include identifying one or more non-residents of subset of non-residents with whom the resident has not had communications, and selecting one of the identified non-residents as the at least one non-resident.

In yet another illustrative, non-limiting embodiment, a method may include accessing a Personal Allowed Number (PAN) list or Pre-Approved Contact (PAC) list associated with a resident of a controlled-environment facility, identifying one or more non-residents listed on the resident's associated PAN or PAC, and providing information to the one or more non-residents regarding the resident's status within the controlled-environment facility. For example, the resident's status may include the resident's physical location within the controlled-environment facility.

The method may also include providing the resident's physical location information obtained via one or more sensors distributed across the controlled-environment facility. The method may further include providing the resident's physical location information to the one or more non-residents in real-time as the resident travels between different places within the controlled-environment facility. The method may also include allowing the one or more non-residents to establish or fund an account associated with the resident. The method may further include providing information to the one or more non-residents about how to release the resident from the controlled-environment facility.

In accordance with various embodiments of systems and methods, for management and dissemination of information from a controlled-environment facility a resident or non-resident may be offered an option to subscribe to notifications about the resident and/or notifications about the controlled-environment facility itself. The non-resident may be offered the opportunity to subscribe to notifications about the particular resident and/or about the controlled-environment facility is during a call by the non-resident to inquire about the resident and/or during a call by the non-resident to fund an account of the resident.

Subscription to notifications about the resident and/or the controlled-environment facility may be accepted, establishing the non-resident as a subscriber. Accepting the subscription may include accepting a telephone number an/or an email address provided by the subscribing non-resident. Accepting and establishing the subscription may further include establishing whether the subscription will be paid or free in some embodiments and accepting funding for the subscription from the subscribing non-resident if the subscription is a paid subscription.

A determination may be made, or an indication may be received, when a change is made to information about the resident and/or when a change is made to information about the controlled-environment facility. The subscriber is then contacted and notified of the change. In accordance with various embodiments of the present systems and methods, the subscriber may be contacted by placing a telephone call to a number provided by the subscriber during subscription and notifying the subscriber of the change(s) and playing an interactive voice message, for example. That is, a controlled-environment facility IVR system may place the call and play the message to the subscriber, presenting the change for the resident and/or the change for the controlled-environment facility. The controlled-environment facility IVR may, at such time present the subscriber an opportunity to obtain further information about the resident and/or the facility using the IVR, during the call. Additionally or alternatively, the IVR may present the subscriber an option to carry an action(s) with respect to the resident corresponding to a similar action(s) previously carried out by a caller associated with the phone number. As a further addition or alternative, the IVR may present the subscriber an offer to facilitate an action related to the change.

In accordance with various embodiments of the present systems and methods, the subscriber may be contacted by sending the subscriber a short message service, enhanced messaging service and/or multimedia message service text message to the number provided by the subscriber during subscription. In such embodiments the notification to the subscriber may provide a statement of the change for the resident and/or the change for the controlled-environment facility. In accordance with various embodiments of the present systems and methods, the subscriber may be contacted by sending an email to the email address provided by the subscriber to notify the subscriber of the change(s) for the resident and/or the controlled-environment facility. Such a notification may include an indication of a former status of the resident and/or the controlled-environment facility and a new status of the resident and/or the controlled-environment facility. Also, notification of the subscriber may be carried out via a website. For example, an email (text or interactive voice message) may include a hyperlink (or otherwise identify a link) to a website where more information about the resident and/or the controlled-environment facility may be obtained by the subscriber. Also, notification of the subscriber may be carried out via a video, such as via video mail (which may be interactive), a video call, or the like.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, a system may include at least one processor and memory coupled to the at least one processor, the memory configured to store program instructions executable by the at least one processor to cause the system to execute one or more operations disclosed herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Figure 1:
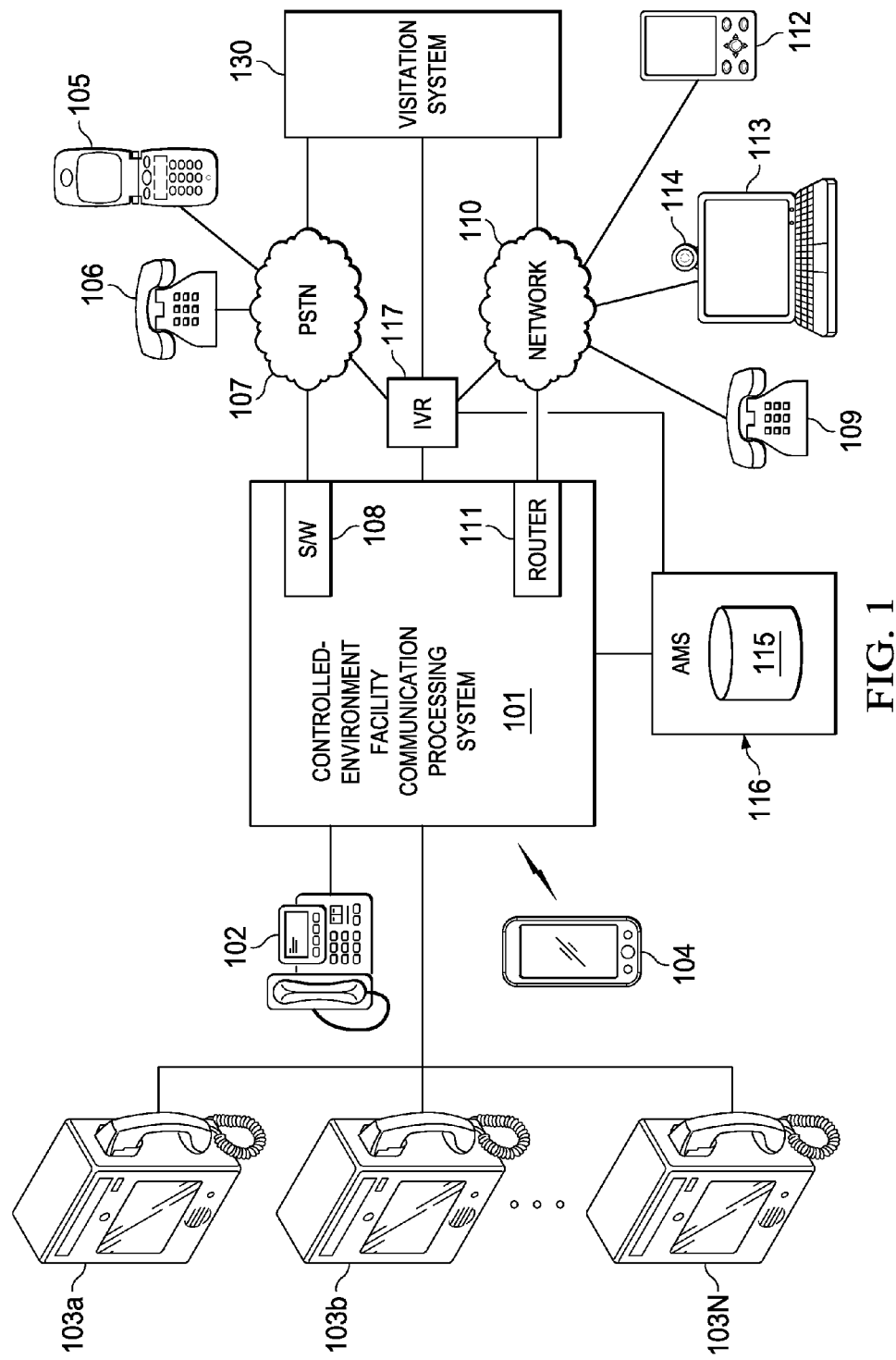
Figure 2:
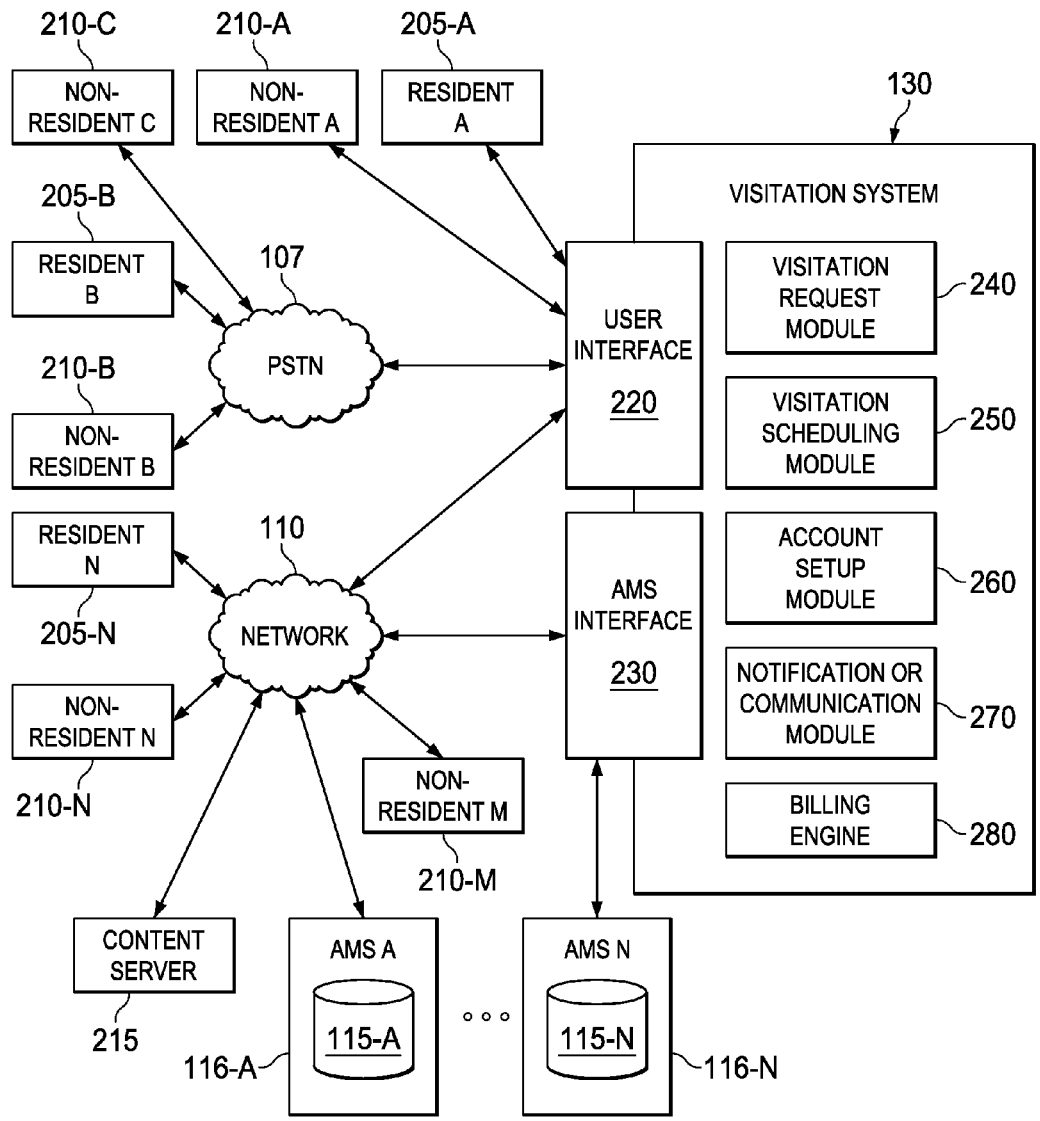
Figure 3:
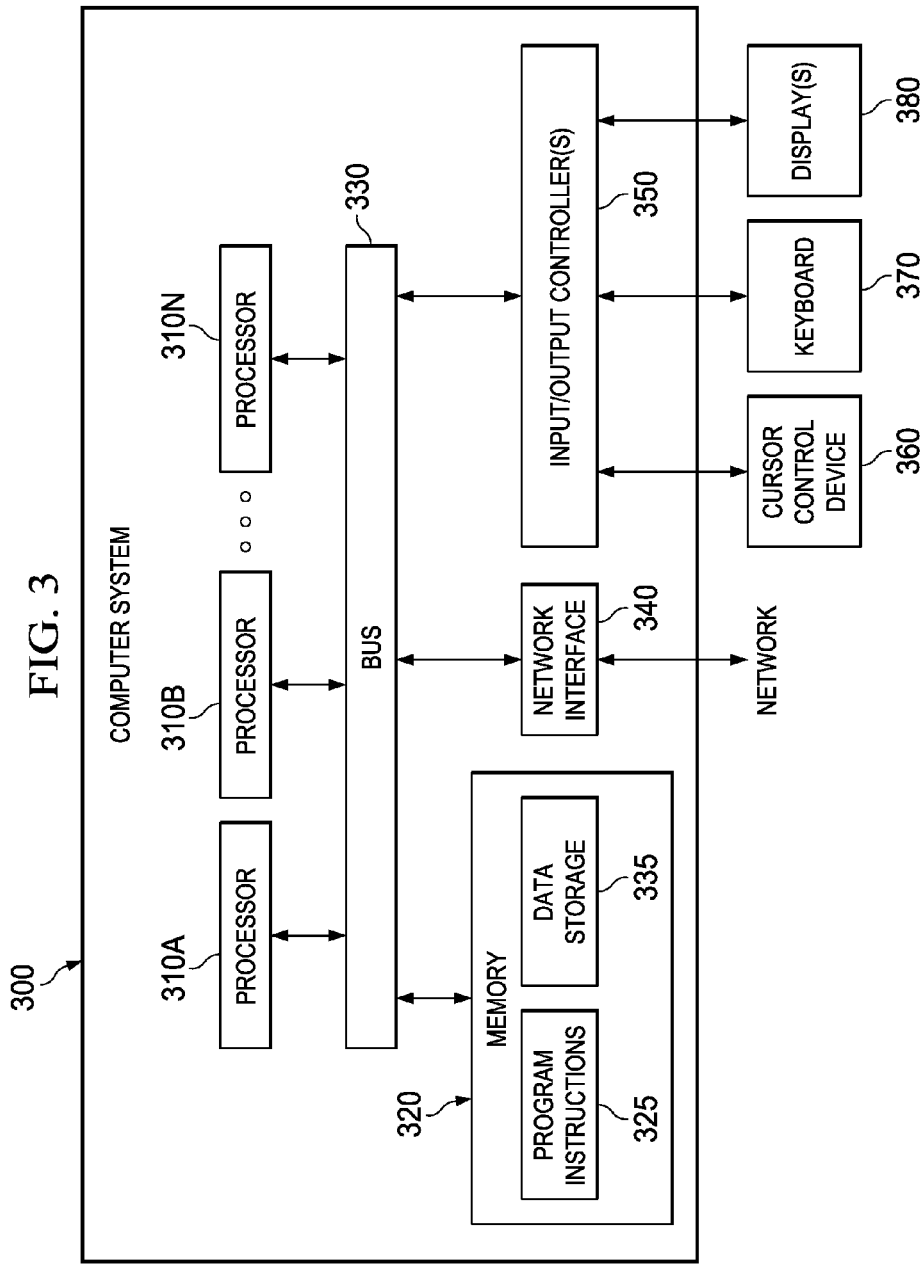
Figure 4:
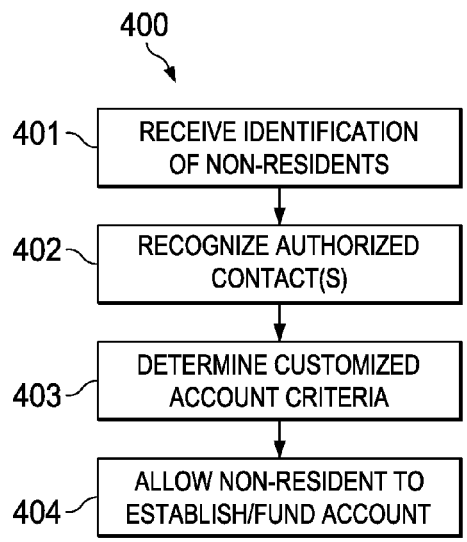
Figure 5:
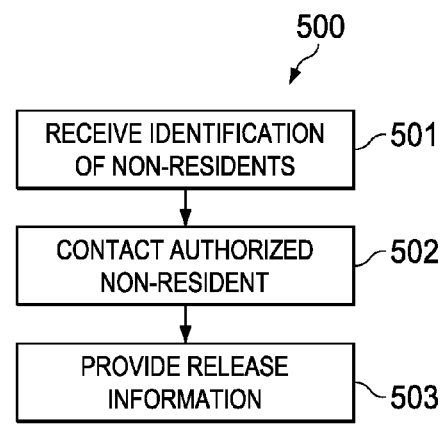
Figure 6:
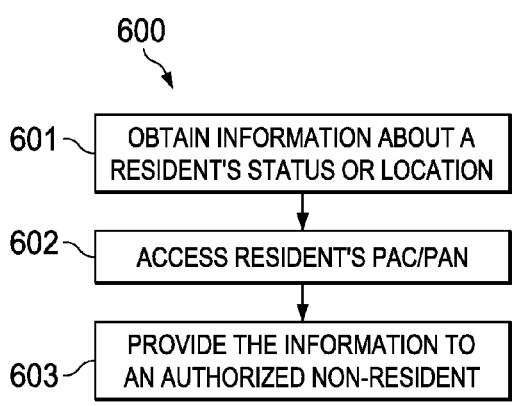
Figure 7:
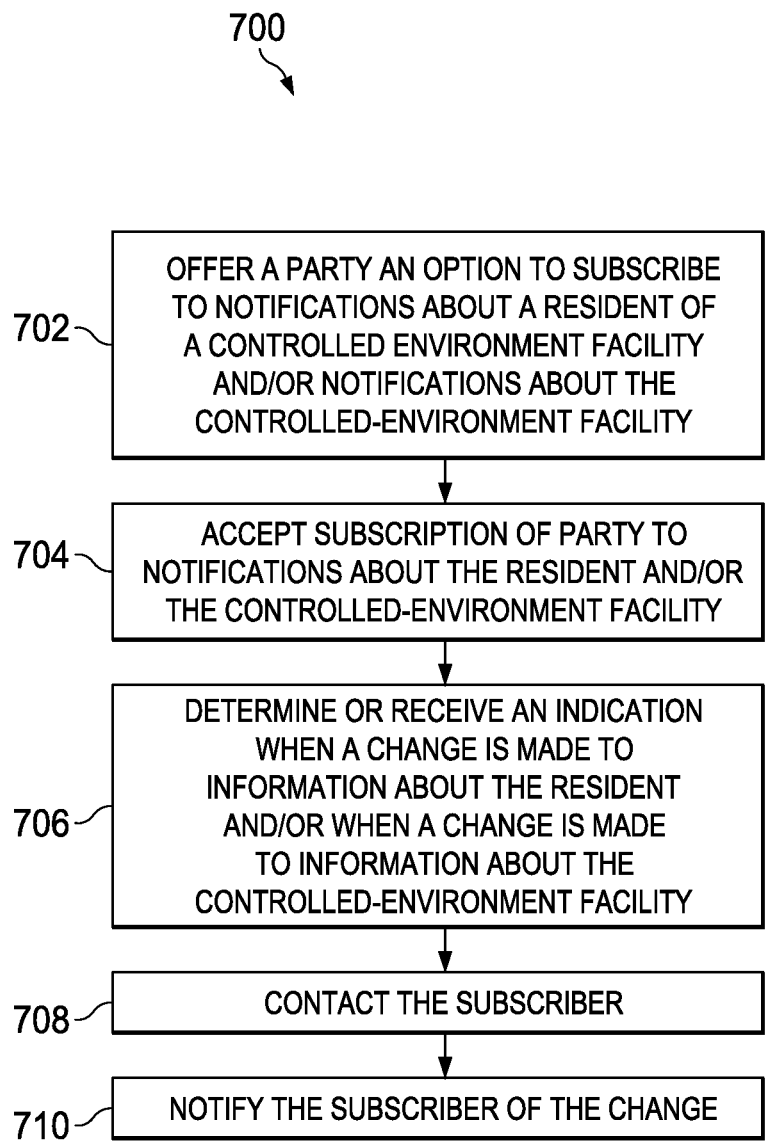

Having thus described the invention in general terms, reference will now be made to the accompanying drawings, which are not necessarily drawn to scale, and wherein:

FIG. 1 is a block diagram of an example of an environment where a communication system may be employed, according to some embodiments;

FIG. 2 is a diagram of an example of a visitation system, according to some embodiments;

FIG. 3 is a block diagram of an example of a computer system configured to implement various systems and methods described herein, according to some embodiments;

FIG. 4 is a flowchart of an example of a method for establishing or funding resident communication accounts, according to some embodiments;

FIG. 5 is a flowchart of an example of a method for providing resident release information to a non-resident, according to some embodiments;

FIG. 6 is a flowchart of an example of a method for providing resident status or location information to a non-resident according to some embodiments; and FIG. 7 is a flowchart of an implementation of an example process for dissemination of information from a controlled-environment facility, in accordance with some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

This specification discloses systems and methods for managing and disseminating information from a controlled-environment facility. Various types of controlled-environment facilities are present in today's society, and persons may be voluntary or involuntary residents of such facilities, whether temporarily or permanently. Examples of controlled-environment facilities may include correctional institutions or facilities (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation clinics, such as drug and alcohol rehabilitation facilities, etc.), restricted living quarters (e.g., hotels, resorts, camps, dormitories, barracks, etc.), and the like.

For convenience of explanation, various examples discussed herein are presented in the context of correctional facilities. For instance, in some of the implementations discussed below, a controlled-environment facility may be referred to as a jail or prison, and its residents may be referred to as arrestees, detainees, or inmates. It should be understood, however, that the systems and methods described herein may be similarly applicable to other types of controlled-environment facilities and their respective residents (e.g., a hospital and its patients, a school dormitory and its students, etc.).

The inventors hereof have recognized that correctional facilities present numerous difficulties in areas such as security, surveillance, financial transactions, communications, visitation, investigation, budgetary, etc.; which in turn make technological implementations uniquely challenging in those environments. In many cases, technologies that are used outside of correctional facilities are not immediately applicable to the correctional environment without significant changes and modifications. Moreover, correctional facilities may have specific needs that are not particularly relevant outside of those environments.

As such, some of the systems and methods described herein may be specifically tailored to address one or more of the aforementioned needs and challenges. It should be understood, however, that other systems and methods described herein may also be applicable to other types of controlled-environment facilities and their respective residents (e.g., a hospital and its patients) and, in some cases, may be applicable to environments that are not controlled at all.

Turning now to FIG. 1, a block diagram of an illustrative environment where a visitation system may be employed is depicted according to some embodiments. As shown, communication processing system 101 may provide telephone services, videoconferencing, online chat, and other communication services to a controlled-environment facility. For example, in some cases, communication system 101 may be co-located with a controlled-environment facility. Alternatively, communication system 101 may be centrally or remotely located with respect to one or more controlled-environment facilities and/or may provide communication services to multiple controlled-environment facilities. More generally, however, it should be noted that communication system 101 may assume a variety of forms, and may be configured to serve a variety of facilities and/or users, whether within or outside of a controlled-environment facility.

In the context of a correctional facility, for instance, inmates may use telephones 102 to access certain communication services. In some facilities, inmates may also use a personal computer wireless device 104 to access such services. For example, an inmate may initiate telephone services by lifting the receiver on telephone 102, at which time the inmate may be prompted to provide a personal identification number (PIN), Radio-Frequency Identification (RFID) tag, or other identifying information or biometrics. Interactive Voice Response (IVR) unit 117 may generate and play prompts or other messages to inmates on devices 102 and/or 104.

Under the control of communication processing system 101, devices 102 and 104 may be capable of connecting to a non-resident's (i.e., a person not incarcerated or otherwise committed to a controlled-environment facility) device 105 or telephone 106 across a publicly switched telephone network (PSTN) 107. For example, device 105 may be a mobile phone, whereas telephone 106 may be located at a non-resident's home, inmate visitation center, etc. Switch 108 in communication processing system 101 may be used to connect calls across PSTN 107. Additionally or alternatively, the non-resident may be at telephone 109 or device 112, which is on an Integrated Services Digital Network (ISDN), Voice-over-IP (VoIP), or packet data network 110, such as, for example the Internet. Router 111 of communication system 101 is used to route data packets associated with a call connection to destination telephone 109 or device 112.

Multipurpose communication devices 103a-n (each collectively referred to as "Multipurpose communication device 103") may have video conferencing capabilities to enable inmates to participate in video visitation sessions with non-residents of the correctional facility via video communication, secure online chat, etc. For example, a non-resident party may have a personal or laptop computer 113 with camera 114 (or a cell phone, tablet computer, etc.). Additionally or alternatively, device 112 may have an integrated camera and display (e.g., a smart phone, tablet, etc.). A network connection between the parties may be established and supported by an organization or commercial service that provides computer services and software for use in telecommunications and/or VOIP, such as SKYPE®. Additionally or alternatively, the correctional facility and/or the destination may use videoconferencing equipment compatible with ITU H.323, H.320, H.264, and/or V.80, or other suitable standards. Generally speaking, each multipurpose communication device 103 may be disposed in a visitation room, in a pod, kiosk, etc.

In addition to providing certain visitation and communication operations, communication processing system 101 may attempt to ensure that a resident's calls, video conferences, online chats, etc. are performed only with non-residents whose identities, names, devices, email addresses, phone numbers, etc. are listed in that resident's Pre-Approved Contact (PAC) list or Personal Allowed Number (PAN) list. Each resident's PAC/PAN list may be stored, for example, in database 115 maintained by Administration and Management System (AMS) 116. In addition to PAC/PAN list(s), AMS 116 may also store resident profile data (RPD), as well as communication and/or visitation rules applicable to each resident.

For example, in the context of a correctional facility, AMS 116 is referred to as a Jail Management System (JMS). Within the AMS or JMS 116, database 115 may include information such as balances for inmate trust and calling or communication accounts; trial schedule; conviction data; criminal record; sentencing data, such as time served, time remaining to be served, and release date; cell and cellmate assignments; inmate restrictions and warnings; commissary order history; telephone call history; call recordings; known or suspected gang or criminal affiliations; known or suspected affiliates, accomplices, or gang members; and any other information that may be relevant or useful to correctional facility staff to house and maintain inmates.

Visitation system 130 may be configured to provide, schedule, and manage visitation or communication services to residents and non-residents of a controlled-environment facility. To that end, visitation system 130 may be coupled to PSTN 107 and/or network 110 in a manner similar to communication processing system 101 by also including one or more gateways, switches and/or routers. Accordingly, visitation system 130 may be configured to communicate with one or more residents of the controlled-environment facility via devices 102-104 and with one or more non-residents via devices 105, 106, 109, 112, and/or 113. Although visitation system 130 is shown in FIG. 1 as being remotely located with respect to communication processing system 101 and the controlled-environment facility, in other cases visitation system 130 may be co-located with the facility and/or integrated within communication system 101.

In some implementations, communication system 101 may be adapted to perform video visitation monitoring operations configured to monitor and/or record video visitation sessions (e.g., as electronic video files). In scenarios where communication system 101 is located within the controlled-environment facility, it may have direct access to AMS or JMS 116. In other embodiments, however, communication system 101 may be located remotely with respect to the controlled-environment facility, and access to AMS or JMS 116 may be obtained via a computer network such as, for example, network 110.

In some implementations, multipurpose communication devices 103 may be computer-based systems. For example, each of multipurpose communication devices 103 may include a display, camera, and handset. The display may be any suitable electronic display such as, for example, a Liquid Crystal Display (LCD), a touchscreen display (e.g., resistive, capacitive, etc.), or the like, whereas the camera may be any suitable imaging device such as, for instance, a video camera or webcam equipped with Charge-Coupled Devices (CCDs), Complementary Metal-Oxide-Semiconductor (CMOS) active pixel sensors, etc. A handset may be similar to a traditional telephone handset including an earpiece portion (with a loudspeaker), a handle portion, and a mouthpiece portion (with a microphone). In other embodiments, Multipurpose communication devices 103 may assume the form of any computer, tablet computer, smart phone, etc., or any other consumer device or appliance with videoconferencing capabilities.

In some embodiments, communication system 101 may be configured to collect and/or determine the incarceration status of a given inmate within a facility, and store that information within AMS 116. For example, as an inmate proceeds through the various stages of incarceration, from arrest to booking to being assigned a jail cell, for example, AMS 116 may be updated accordingly.

Additionally or alternatively, the physical location of each inmate within the controlled-environment facility may be detected or otherwise input into communication system 101 for storage within AMS. For instance, when a given inmate travels between different locations within the facility (e.g., from his or her jail cell to the cafeteria or visitation area), one or more RFID sensors distributed throughout the facility may pick up a signal from an RFID tag worn by the inmate, and communication system 101 may save that information in AMS 116. In some cases, an inmate's physical location information may be obtained in real-time.

Additionally or alternatively, health or medical status for each inmate may also be stored within AMS. For example, when an inmate visits the infirmary, consults a doctor, receives a prescription, obtains medication, etc., related information may be stored in a suitable database and be provided to non-residents at a later time.

In accordance with some embodiments, a constituent may be offered an opportunity to subscribe to such notifications for a particular resident, such as during a call to inquire about the resident, fund his or her account(s), via a website, in a text message, and/or the like. Similarly the resident him or herself may be offered an opportunity to receive such notifications, such as on an intelligent resident device (e.g. a smartphone, tablet computing device, or the like, adapted and/or accepted for use in the controlled-environment facility.) Such a subscription offer may be presented to the resident or non-resident, during, before or after any voice call, video call or visitation, or any other communication.

Thereafter, when changes with respect to that resident, such as changes in AMS 116, occur a notification message to the subscriber is triggered. As noted, such notifications may take the form of a phone call (such as may be initiated and carried out by IVR 117, for example), an email (such as may be sent by controlled-environment facility administration and management system 116, for example), an SMS text such as may be sent by controlled-environment facility communication management system 101, (for example), a video mail or call, notification via a website, or the like. In accordance with various embodiments, and as discussed in greater detail below, the message may contain such information on the change in status, information, or the like, as the notification medium will afford. For example, an SMS text may only include a brief statement of the nature of the new status, while an email may detail the former status as well as presenting the new status and any related information, Internet links, or such. Similarly, a notification call by IVR 117, or the like, may in accordance with the present systems and methods, afford the subscriber an opportunity to acquire further information about the resident using IVR 117, such as during the same call to the subscriber. To this end, IVR 117 may facilitate repetition of a last requested action in accordance with the present systems and methods and/or offer to facilitate an action related to the changed status or information during the call to the subscriber.

Referring to FIG. 2, a block diagram of system 130 for providing visitation services to residents of a controlled-environment facility is depicted according to some embodiments. As shown, visitation system 130 includes user interface 220 and AMS or JMS interface 230. In some embodiments, residents and/or non-residents of one or more controlled-environment facilities may access, interact with, or otherwise use visitation system 130 via user interface 220. For example, user interface 220 may be provided as a web interface, IVR interface, or the like.

In some scenarios, resident 205-A and/or non-resident 210-A may connect to visitation system 130 via user interface 220. For example, resident 205-A and/or non-resident 210-A may directly or indirectly (e.g., through an officer or personnel of the controlled-environment facility) reach a computer terminal or a telephone disposed within a controlled-environment facility and request visitation services.

In other scenarios, resident 205-B, non-resident 210-B, and/or non-resident 210-C may interact with user interface 220 via PSTN 107 using an IVR system or the like. Additionally or alternatively, resident 205-N, non-resident 210-N, and/or non-resident 210-M may access a website, webpage, Internet portal, etc. via a computer network or Internet 110, for example, using a personal computing device (e.g., running a web browser), cell phone (e.g., via an "app"), prison terminal, or any other suitable client device. Content server 215 may be configured to provide electronic content (e.g., video, audio, television programming, motion pictures, etc.) to visitation system 130 via user interface 220, AMS interface 230, or any other suitable interface. Additionally content may be created by visitation system 130 via user interface 220 to be viewed by non-residents 210A, 210b, 210C, 210N.

When implemented to support web-based interactions, user interface 220 may be deployed using a number of suitable techniques. For example, user interface 220 may be implemented using Hypertext Markup Language (HTML), Common Gateway Interface (CGI), Javascript, PHP, Perl, C/C++, or any suitable combination of these or other commercial, open source and/or proprietary languages, frameworks or development environments for generating and distributing web-based information. Further, in some implementations, a request and response data may be exchanged between a client and visitation system 130 through the use of messages or documents formatted in eXtensible Markup Language (XML) or other platform-independent data format. For example, in some embodiments, a web services request to provide visitation services may be embodied in an XML document including fields identifying the person(s) that will be participating in the visitation, the type, time, and/or duration of the visitation, and possibly other fields, in which each field is delimited by an XML tag describing the type of data the field represents. In other implementations, web services-related documents may be transmitted between applications making requests and targeted web services using a web-based data transfer protocol, such as a version of the Hypertext Transfer Protocol (HTTP), for example.

In some embodiments, visitation system 130 may interact with one or more AMS or JMS systems 116A-N either directly or via a computer network such as the Internet 110. As previously noted, each AMS or JMS system 116A-N may each include its own database 115A-N, respectively. Generally speaking, databases 115A-N may include any suitable type of application or data structure that may be configured as a persistent data repository. For example, databases 115A-N may be configured as relational databases that include one or more tables of columns and rows and that may be searched or queried according to a query language, such SQL or the like. Alternatively, databases 115A-N may be configured as structured data stores that include records formatted according to a markup language, such as XML or the like. In other embodiments, databases 115A-N may be implemented using one or more arbitrarily or minimally structured files managed and accessible through a corresponding type of application.

In addition to interfaces 220 and 230, visitation system 130 includes visitation request module 240, visitation scheduling module 250, account setup module 260, notification or communication module 270, and billing engine 280. Visitation request module 240 may be configured to receive one or more visitation scheduling requests, modification requests, or cancellation requests, for example, via user interface 220. Visitation scheduling module 250 may be configured to execute an incoming request, for example, by scheduling a new multi-party or event-driven visitation, modifying a previously scheduled multi-party or event-driven visitation, or canceling the previously scheduled multi-party or event-driven visitation.

Account setup module 260 may be configured to identify one or more non-residents and allow those non-residents to establish and/or fund communication or calling accounts for a given inmate. Further, account setup module 260 may be employed as part of subscription by a non-resident, or resident, to notifications about changes to a status of the resident, such as with respect to the controlled-environment facility, or information about a resident and/or the controlled-environment facility itself. Notification module 270 may be configured to notify a party (such as, in some examples, in conjunction with IVR 117) of a particular visitation, modification, cancelation, etc. In some embodiments, notification module 270 may also be used to provide resident release information and/or to provide resident status or location information to non-residents, such as the aforementioned subscribers. Billing engine 280 may be configured to determine parameters such as a number of parties or devices participating in a visitation of communication session, a type of session, etc. and bill a resident or non-resident for the communication session depending upon those parameters. These, and other techniques, are illustrated in more detail below.

In various embodiments, modules 220-280 shown in FIG. 2 may represent sets of software routines, logic functions, and/or data structures that are configured to perform operations described herein. Although these modules are shown as distinct logical blocks, in other embodiments at least some of the functionality provided by these modules may be combined into fewer blocks. Conversely, one or more of modules 220-280 may be implemented such that it is divided among two or more logical blocks. Moreover, although shown with a particular configuration, in other embodiments these various modules may be rearranged in other ways.

Also, in certain embodiments, each of the different components of visitation system 130 may be implemented in software, hardware or any suitable combination thereof, in an integrated fashion (e.g., on a single server or computer system) or in a distributed fashion (e.g., via a number of discrete systems configured to communicate with one another via a network). Additionally or alternatively, the operation of visitation system 130 may be partitioned into components in a different fashion than illustrated in FIG. 2.

Embodiments of systems and methods for remote multi-party and/or event-driven visitation for residents of controlled-environment facilities, as described herein, may be implemented or executed by one or more computer systems. One such computer system is illustrated in FIG. 3. In various embodiments, computer system 300 may be a server, a mainframe computer system, a workstation, a network computer, a desktop computer, a laptop, or the like. For example, in some cases, one or more of the blocks shown in FIG. 2 may be implemented as computer system 300. Moreover, one or more of communication devices 103, 104, and 113; communication system 101; and visitation system 130 may include one or more computers in the form of computer system 300. As explained above, in different embodiments these various computer systems may be configured to communicate with each other in any suitable way, such as, for example, via network 110.

As illustrated, computer system 300 includes one or more processors 310A-N coupled to a system memory 320 via bus 330. Computer system 300 further includes a network interface 340 coupled to bus 330, and one or more I/O controllers 350, which in turn are coupled to peripheral devices such as cursor control device 360, keyboard 370, display(s) 380, etc. Each of I/O devices 360-380 may be capable of communicating with I/O controllers 350, for example, via a wired connection (e.g., serial port, Universal Serial Bus port) or wireless connection (e.g., Wi-Fi, Bluetooth, Near Field Communications Link, etc.) Other devices may include, for example, surveillance cameras, microphones, antennas/wireless transducers, phone detection modules, etc.

In various embodiments, computer system 300 may be a single-processor system including one processor 310A, or a multi-processor system including two or more processors 310A-N (e.g., two, four, eight, or another suitable number). Processors 310A-N may be any processor capable of executing program instructions. For example, in various embodiments, processors 310A-N may be general-purpose or embedded processors implementing any of a variety of instruction set architectures (ISAs), such as the x86, PowerPC®, ARM®, SPARC®, or MIPS® ISAs, or any other suitable ISA. In multi-processor systems, each of processors 310 may commonly, but not necessarily, implement the same ISA. Also, in some embodiments, at least one processor 310A may be a graphics processing unit (GPU) or other dedicated graphics-rendering device.

System memory 320 may be configured to store program instructions and/or data accessible by processor(s) 310A-N. In various embodiments, system memory 320 may be implemented using any suitable memory technology, such as static random access memory (SRAM), synchronous dynamic RAM (SDRAM), nonvolatile/Flash-type memory, or any other type of memory. As illustrated, program instructions and data implementing certain operations such as those described herein may be stored within system memory 320 as program instructions 325 and data storage 335, respectively. In other embodiments, program instructions and/or data may be received, sent or stored upon different types of computer-accessible media or on similar media separate from system memory 320 or computer system 300.

Generally speaking, a computer-accessible medium may include any tangible or non-transitory storage media or memory media such as electronic, magnetic, or optical media—e.g., disk or CD/DVD-ROM coupled to computer system 300 via bus 330. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, bus 330 may be configured to coordinate I/O traffic between processor 310, system memory 320, and any peripheral devices in the device, including network interface 340 or other peripheral interfaces, such as input/output devices 350. In some embodiments, bus 330 may perform any necessary protocol, timing or other data transformations to convert data signals from one component (e.g., system memory 320) into a format suitable for use by another component (e.g., processor 310). In some embodiments, bus 330 may include support for devices attached through various types of peripheral buses, such as a variant of the Peripheral Component Interconnect (PCI) bus standard or the Universal Serial Bus (USB) standard, for example. In some embodiments, the function of bus 330 may be split into two or more separate components, such as a northbridge chipset and a southbridge chipset, for example. In addition, in some embodiments some or all of the functionality of bus 330, such as an interface to system memory 320, may be incorporated directly into processor(s) 310A-N.

Network interface 340 may be configured to allow data to be exchanged between computer system 300 and other devices attached to a network, such as other computer systems, or between nodes of computer system 300. In various embodiments, network interface 340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

I/O controllers 350 may, in some embodiments, enable communications with one or more display terminals, keyboards, keypads, touchpads, scanning devices, voice or optical recognition devices, mobile devices, or any other devices suitable for entering or retrieving data by one or more computer system 300. Multiple I/O controllers 350 may be present in computer system 300 or may be distributed on various nodes of computer system 300. In some embodiments, I/O devices may be separate from computer system 300 and may interact with one or more nodes of computer system 300 through a wired or wireless connection, such as over network interface 340.

As shown in FIG. 3, memory 320 may include program instructions 325, configured to implement certain embodiments described herein, and data storage 335, comprising various data may be accessible by program instructions 325. In an embodiment, program instructions 325 may include software elements of embodiments illustrated herein. For example, program instructions 325 may be implemented in various embodiments using any desired programming language, scripting language, or combination of programming languages and/or scripting languages (e.g., C, C++, C#, Java™, JavaScript™, Perl, etc.). Data storage 335 may include data that may be used in these embodiments (e.g., recorded communications, profiles for different modes of operations, etc.). In other embodiments, other or different software elements and data may be included.

A person of ordinary skill in the art will appreciate that computer system 300 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Turning now to FIG. 4, a flowchart of method 400 for establishing or funding resident communication accounts is depicted. In some embodiments, method 400 may be performed, at least in part, by communication system 101 and/or visitation system 130 of FIG. 1. As shown, at block 401, method 400 may include receiving identification information for non-residents with whom a resident is allowed to communicate. For example, block 401 may correspond to a stage in the inmate's incarceration when the inmate provides the identification information to facility personnel and/or computer systems (e.g., during booking, etc.). In some implementations, such information may include names, phone numbers, or email addresses of each non-resident.

At block 402, method 400 may include recognizing, among the non-residents identified in block 401, those that may be authorized to be contacted by the inmate. For example, facility personnel and/or computer systems may use the identification information to perform criminal background checks, run credit reports, etc. for each non-resident. The subset of authorized non-residents may be added to that particular resident's PAN/PAC list.

At block 403, method 400 may include determining certain criteria for establishing or funding the resident's communication accounts such as, for example a calling account or the like. In some cases, the criteria may be determined based upon a service contract between he facility and a telecommunications carrier. Examples of relevant criteria may include, but are not limited to, available communication products, pricing, other costs including taxes and fees, rules and restrictions based upon account type and facility requirements, etc.

At block 404, method 400 may include initiating contact with a selected one of the subset of non-residents and, during the contact, allowing the selected non-resident to establish or fund an account for the resident or non-resident. In some cases, the selected non-resident may be proactively contacted depending upon whether there has been any attempt, a number of attempts, or a number of successful attempts by the resident to contact the non-resident. In other cases, the selected non-resident may be proactively contacted to ask for account funds, even though the selected non-resident may not be the person communicating with the inmate (i.e., ordinarily a non-payer). For instance, the resident's PAC/PAN list may include a number of non-resident persons and the selected non-resident may be one of those non-residents with whom the resident has not had communications since his or her incarceration, or for a selected period of time (e.g., the past 2 weeks or 3 months).

In some implementations, the operations of block 404 may be performed at least in part, by an IVR system configured to automatically dial a selected non-resident's telephone number. The IVR system may then provide some or all of the criteria information of block 403 and may collect billing information sufficient to allow creation and/or funding or a calling account or the like (e.g., credit card account, bank account, etc.). Moreover, in other implementations, contacting the non-resident may be performed via an email, instant message, chat session, video message, etc. For example, an email may be sent to the selected non-resident that contains a hyperlink which, when clicked or activated by the non-resident, directs the non-resident's web browser to a webpage from where the non-resident can provide credit card information, bank account information, etc.

It should be appreciated that, in some cases, the operations of FIG. 4 may also be used to create other types of accounts, different from communications or calling accounts. Generally speaking, communication or calling accounts may be usable primarily for funding a resident's communications. In other embodiments, however, a selected non-resident may be proactively contacted to establish and/or fund commissary accounts primarily usable by a resident to purchase commissary goods sold under control of the controlled-environment facility.

FIG. 5 is a flowchart of an example of method 500 for providing resident release information to a non-resident. In some embodiments, method 500 may be performed, at least in part, by communication system 101 and/or visitation system 130. As shown, at block 501, method 500 may include receiving identification of a plurality of non-residents. Such identification may be received directly from the resident and/or from PAC/PAN list(s) previously associated with the resident.

At block 502, method 500 may include contacting a selected non-resident. As in block 503 of FIG. 5, here the contact may be performed via IVR system, email, website, chat, video message, etc. Then, at block 503, method 500 may include providing the contacted non-resident information about how to release the resident from the controlled-environment facility.

For example, the information may include contact information for a bail bonds or legal service available to the resident. It should be noted that, in some cases, the types of service available to a particular resident may be different from those available to another resident even within the same facility. As an example, a given resident may not be eligible to post bond, while another resident may be. If the resident's RPD record indicates that the resident can be released on bond, the contact of a bondsman may be provided to the non-resident; otherwise that information may be withheld or not available.

As another example, a given resident may be eligible to access a public defender or pro bono attorney, whereas other residents may not be. Moreover, certain residents may be charged with felonies or other serious crimes, and other residents may be charged with misdemeanors or less serious offenses. In each case, different types or services or service providers may be more suitable for securing a resident's release from the facility. Accordingly, in some embodiments the information provided to the non-resident may be automatically customized to the resident's particular incarceration situation.

In some embodiments, release information provided at block 503 may include an offer for the automatic bonding of the resident. For example, the telecommunications carrier or communications service provider serving the controlled-environment facility may act as bonding agent and/or work in cooperation with a bonding agent so as to allow the contacted non-resident to post bond for the benefit of the resident upon successful completion of an automated application process (e.g., via IVR, etc.) or the like.

FIG. 6 is a flowchart of one example of method 600 for providing resident status or location information to a non-resident. In some embodiments, method 600 may be performed, at least in part, by communication system 101 and/or visitation system 130. As shown, at block 601, method 600 may include obtaining a resident's status or physical location within a controlled-environment facility. In some cases, the resident's status or physical location may be retrieved from AMS 116 and/or an RPD database.

For instance, the status may include whether or not the resident is incarcerated, whether the resident has been arrested, has been booked, has been assigned a jail cell, has been approved to participate in a work-release program, has a preselected minimum amount of money in a calling or commissary account, is sick or undergoing medical treatment for a given condition, etc. Additionally or alternatively, the status may include medical or health-related information about the resident. Additionally or alternatively, the physical location of the resident may include a specific room (e.g., by name, type, code, number, etc.) within the facility, an area of the facility (e.g., a visitation area, a booking area, a common area, etc.), a particular jail cell, or the like.

At block 601, method 600 may include accessing the resident's associated PAN/PAC list and identifying one or more non-residents on that list. Then, at block 602, method 600 may include providing information to the one or more non-residents regarding the resident's status, such as with respect to the controlled-environment facility, or physical location within the controlled-environment facility. In some implementations, the operations of block 602 may be configured as a "follow-me" service that updates the non-resident with respect to the resident's status and/or location in real-time or near real-time as the resident moves within the facility and/or is further processed by the facility personnel. The "follow me" service may automatically provide information to the non-resident via telephone, email, text messages, etc. In some cases, two or more modes of communication may be employed at once to ensure the non-resident's receipt of the resident's status or physical location in a timely manner.

As noted, in accordance with various further embodiments or implementations of the present systems and methods, paid and/or unpaid subscribers may be provided notifications of controlled-environment facility resident changes via phone, email, SMS notifications, or the like, as updated inmate information. Such subscribers may include friends, family, and/or other constituents or interested parties, such as an inmate's victim(s), a prosecuting or defense attorney responsible for an inmate's case, or the like, or even the resident/inmate themselves. Typically, changes in bond information, charges, movements, etc. are only communicated to constituents by the inmate his or herself, and sometimes by the facility, such as discussed above. These further embodiments or implementations afford an ability to provide immediate communication of pertinent and important resident and facility information to paid (cost for a subscription may be per resident) and/or unpaid subscribers (friends, family, attorneys, concerned constituents, bail bondsmen, victims and the press, among others, in detention facility implementations). With such notifications, any change made to a resident's information, such as may be hosted by a JMS or other controlled-environment administration and management system, can be communicated to a subscriber. In addition, such embodiments provide an ability or avenue for facilities to broadcast important information to multiple subscribers, such as friends and family, attorneys, victims, concerned constituents, bail bondsmen and the press, among others.

FIG. 7 is a flowchart of an implementation of example process 700 for dissemination of information from a controlled-environment facility, in accordance with some embodiments. Therein, a controlled-environment IVR (117) may, at 702, offer a party, such as a non-resident, or the resident him or herself, an opportunity to subscribe to notifications about a particular resident of a controlled-environment facility and/or notifications about the controlled-environment facility itself. By way of example, the opportunity may take the form of an option prompt resented by the controlled-environment facility IVR (117) during a call from or to the non-resident to or from the controlled-environment facility. Such a call may be to inquire about the resident, to inform the non-resident about the resident's confinement to the controlled-environment facility, to fund an account of the resident or non-resident, to solicit funds for an account of the resident, and/or the like.

As part of a subscription process at 704, the controlled-environment IVR (117) or other system, may accept various identification and/or contact information for the subscriber, such as the subscriber's telephone number, email address, etc. Further, the subscription process may establish whether the subscription will be paid or not paid or free, and may include accepting funding (e.g. a credit card number, banking account information, or the like) from the subscriber if the subscription is a paid subscription. The subscription process may also include selection of various options, such as the subscriber's preferred method of communication, whether the subscriber wishes to specify a type of back-up communication if the subscriber is not reached immediately with a change notification using the preferred method of communication, etc. Such options might also include a "sensitivity" of triggers for notification (i.e. small changes in a resident's or facilities status may trigger a notification, or a more serious change in status may be required), such triggers may be dependent on whether the subscription is paid or free and/or on level (i.e. cost) of a paid subscription.

Once subscription is complete the non-resident is established as a subscriber. Thereafter, when a change is made to information about the resident, such as changes in information hosted by a controlled-environment management system (e.g. information maintained in database 115 of AMS 116), and/or when a change is made to information about the controlled-environment facility, at 706, a notification to the subscriber may be triggered. That is, the IVR (117), or the like may determine at 706 when information about the resident hosted by the controlled-environment administration and management system (AMS 116) changes and/or when a change is made to information about the controlled-environment facility. Alternatively or additionally, an indication from a controlled-environment facility administration and management system (AMS 116), or the like, may be provided (such as to IVR 117) when information about the resident and/or the controlled-environment facility changes.

At 708 the subscriber is contacted and notified of the change for the resident and/or the controlled-environment facility at 710, such as via a voice call, text message, video mail, video call, a website notice, or the like. As one example, in accordance with various embodiments, the subscriber may be telephoned (708) at the number provided during subscription by the controlled-environment facility IVR (117) and notified (710) of the change by playing of a voice message, such as an interactive voice message. Such an interactive voice message may, in accordance with some embodiments, present the subscriber an opportunity to obtain further information about the resident and/or the facility, using the IVR, during the call. Additionally or alternatively, the controlled-environment facility IVR may present the subscriber an option to carry out at least one action with respect to the resident corresponding to a category of an action last carried out by a caller associated with the phone number. For example, if the last time a call party associated with the number was contacted or contacted the facility, the party deposited money to an account maintained for the benefit of the resident, the IVR may inquire as to whether the call party would like to again make such a deposit. Further, the IVR may present the subscriber an offer to facilitate an action related to the change. For example, in a jail facility embodiment, if the resident has become eligible to be bailed out the IVR may offer the subscriber a means or avenue to pay the bail during the call, and/or provide the subscriber information about bail bondsmen, or the like, such as discussed above.

As a further example, in accordance with some embodiments, the subscriber may be contacted at 708 by or through the IVR (117), the controlled-environment facility communication system (101), or the like, sending a short message service (SMS), enhanced messaging service (EMS) and/or multimedia message service (MMS) text message to the number provided by the subscriber. This text message may notify (710) the subscriber of the change for the resident and/or the change for the controlled-environment facility in a statement crafted to fit in a text message. For example, in an incarceration facility embodiment, an SMS may read something like "John Smith is scheduled for release from Prison on Feb. 14, 2015. For more information go to URL.com."

In contrast, the subscriber may be contacted via email at 708, at an email address provided during subscription to provide notification 710 of the change for the resident and/or the controlled-environment facility. This email may be sent by or through the IVR (117), the controlled-environment facility communication system (101), the AMS (116), or the like. Such an email may contain somewhat more information than a text message, or the like. For example, notification of the change for the resident and/or the controlled-environment facility in the email may include an indication of a former status of the resident and/or the controlled-environment facility, as well as the new status of the resident and/or the controlled-environment facility. Additionally, a hyperlink, of the like, may be provided to a website, or the like, where more information about the resident and/or the controlled-environment facility may be obtained by the subscriber. Hence, a corresponding example incarceration embodiment email message might indicate something like: "John Smith was granted parole on Jan. 15, 2015 by the State Parole Board. Johns Smith will be released from Prison on Feb. 14, 2015, at approximately 2:00 pm, Central Standard Time. More information about John Smith and Prison may be obtained by clicking on URL.com. Please be prepared to provide your login and password to access certain information."

In accordance with embodiments of the present systems and methods, an example implementation of a controlled-environment facility notification system applying process 700, may include controlled-environment management system, such as AMS 116 discussed above, wherein information about residents of the controlled-environment facility and information about the controlled-environment facility may be stored, such as in database 115. Further, IVR 117, controlled-environment communication processing system 101, and/or the like, may be employed as a part of the controlled-environment facility notification system to offer the non-resident an opportunity or option to subscribe to notifications about a particular resident of the controlled-environment facility and/or notifications about the controlled-environment facility at 702, as discussed above.

IVR 117, controlled-environment communication processing system 101, and/or the like, may also accept the subscription of the non-resident as a subscriber to notifications for the particular resident and/or notifications about the controlled-environment facility at 704, as discussed. The subscription may include contact information for the non-resident, as noted, such as a telephone number and/or an email address of the non-resident, and may also include any required payment arrangements.

Further, IVR 117, controlled-environment communication processing system 101, and/or the like, may, such as in conjunction with AMS 116, or the like, determine and/or otherwise recognize, at 706, when a change is made to the information about the resident that is stored by the controlled-environment management system 116 in database 115 and/or when a change is made to information about the controlled-environment facility, similarly stored by the controlled-environment management system 116 in database 115. Such determination or recognition at 706, may, in certain embodiments, take the form of AMS 116, or the like, notifying, or otherwise indicating to, IVR 117, 117, controlled-environment communication processing system 101, and/or the like, by way of example, when a change is made to resident and/or facility information in database 115.

As noted, the subscriber may be contacted at 708 using the subscription contact information through an interactive telephone call, by sending a text message or via email. At 710 the subscriber is notified of the change during the contact. As discussed above, IVR 117 may present the subscriber an option to carry out action(s) with respect to the resident corresponding to category(ies) of action(s) previously carried out by a caller associated with the telephone number. IVR 117 may also present the subscriber an opportunity to obtain further information about the resident and/or an offer to facilitate an action related to the change, using the IVR during an interactive telephone call, such as described above. As also noted above an email notification of the change for the resident and/or the controlled-environment facility may include an indication of a former status of the resident and/or the controlled-environment facility and a new status of the resident and/or the controlled-environment facility, and may include a hyperlink to a website where more information about the resident and/or the controlled-environment facility may be obtained.

In some embodiments, the various operations described above may be used to disseminate information to non-residents in other suitable ways. For example, a website may be provided such that an inmate's family and friends are able to log in and obtain information concerning that inmate. Additionally or alternatively, such information may be provided to non-residents via a native software application, such as a mobile application downloaded and/or executed on a non-resident's mobile device and/or via a desktop software application. As such, the foregoing information dissemination techniques may be used such that information is available for non-residents to access anytime and/or in real-time.

It should be understood that the various operations described herein, particularly in connection with FIGS. 4 through 7, might be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The various systems and methods illustrated in the figures and described herein represent example embodiments. The methods may be implemented in software, hardware, or a combination thereof. The order in which each operation of a given method is performed may be changed, and various elements of the systems illustrated herein may be added, reordered, combined, omitted, modified, etc. Various modifications and changes may be made as would be clear to a person of ordinary skill in the art having the benefit of this specification. It is intended that the invention(s) described herein embrace all such modifications and changes and, accordingly, the above description should be regarded in an illustrative rather than a restrictive sense.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method comprising:
offering a party to a controlled-environment facility communication an opportunity, by one or more controlled-environment facility computer systems, to become a subscriber to notifications about a particular resident and/or about the controlled-environment facility before, after, and/or during the communication, wherein the notifications that are offered are determined based on an incarceration status of the resident;
accepting a subscription, from a subscriber by the one or more computer systems, to notifications about the particular resident of a controlled-environment facility and/or notifications about the controlled-environment facility;
determining, or receiving an indication, by the one or more computer systems when a change is made to information about the resident in the same or different one or more computer systems and/or when a change is made to information about the controlled-environment facility;
contacting the subscriber; and
notifying the subscriber of the change.

2. The method of claim 1, further comprising offering a non-resident or the resident an opportunity to subscribe to notifications about the resident and/or about the controlled-environment facility on a website, in a telephone call, and/or in a text message.

3. The method of claim 1, wherein the communication is a communication by a non-resident to inquire about the resident.

4. The method of claim 1, wherein the communication is a communication by a non-resident to fund an account of the resident.

5. The method of claim 1, wherein accepting the subscription further comprises establishing whether the subscription will be a paid subscription or a free subscription and accepting funding from the subscriber if the subscription is a paid subscription.

6. The method of claim 1, wherein accepting the subscription further comprises accepting a telephone number and/or an email address provided by the subscriber.

7. The method of claim 6, wherein contacting the subscriber further comprises placing a telephone call to the number provided by the subscriber and notifying the subscriber comprises playing an interactive voice message, by a controlled-environment facility interactive voice response system, to the subscriber, presenting the change for the resident and/or the change for the controlled-environment facility.

8. The method of claim 7, wherein the controlled-environment facility interactive voice response system presents the subscriber an opportunity to obtain further information about the resident and/or the facility using the interactive voice response system during the call.

9. The method of claim 7, wherein the controlled-environment facility interactive voice response system presents the subscriber an option to carry out at least one action with respect to the resident and/or facility corresponding to at least one category of at least one action last carried out by a caller associated with the phone number.

10. The method of claim 7, wherein the controlled-environment facility interactive voice response system presents the subscriber an offer to facilitate an action related to the change.

11. The method of claim 6, wherein contacting the subscriber further comprises sending a short message service, enhanced messaging service and/or multimedia message service text message to the number provided by the subscriber and notifying the subscriber comprises providing the subscriber a statement of the change for the resident and/or the change for the controlled-environment facility.

12. The method of claim 6, wherein contacting the subscriber comprises sending an email to the email address provided by the subscriber to notify the subscriber of the change for the resident and/or the change for the controlled-environment facility.

13. The method of claim 12, wherein notification of the change for the resident and/or the change for the controlled-environment facility in the email includes an indication of a former status of the resident and/or the controlled-environment facility and a new status of the resident and/or the controlled-environment facility.

14. The method of claim 12, wherein the email includes at least one hyperlink to a website where more information about the resident and/or the controlled-environment facility may be obtained by the subscriber.

15. The method of claim 1 wherein notifying the subscriber of the change comprises, at least in part notifying the subscriber of the change via a website.

16. The method of claim 1 wherein notifying the subscriber of the change comprises, at least in part notifying the subscriber of the change via a video.

17. A controlled-environment facility notification system comprising:
one or more computer systems, each comprising at least one processor and a memory coupled to the at least one processor, the memory configured to store program instructions executable by the at least one processor to cause the one or more computer systems to controlled-environment management system to:
store information about residents of the controlled-environment facility and information about the controlled-environment facility; and
offer an opportunity to become a subscriber to notifications about a particular resident and/or about the controlled-environment facility, wherein the notifications that are offered are determined based on an incarceration status of the resident;
accept a subscriber's subscription to offered notifications for a particular resident of the controlled-environment facility and/or notifications about the controlled-environment facility, the subscription including contact information for the subscriber and payment for the subscription is the subscription is not a free subscription;
determine, or receive an indication from another of the one or more computer systems, when a change is made to the information about the resident stored by the one or more computer systems and/or when a change is made to information about the controlled-environment facility stored by the one or more computer systems;
contact the subscriber by telephone, by sending a text message, via video, and/or via email; and
notify the subscriber of the change during the contact or by directing the subscriber to a website.

18. The controlled-environment facility notification system of claim 17, wherein the one or more computer systems present a non-resident or the resident an opportunity to subscribe to notifications about the resident and/or about the controlled-environment facility on a website, in a telephone call, and/or in a text message.

19. The controlled-environment facility notification system of claim 17, wherein the one or more computer systems present the subscriber an option to carry out at least one action with respect to the resident corresponding to at least one category of at least one action last carried out by the subscriber.

20. The controlled-environment facility notification system of claim 17, wherein the one or more computer systems present the subscriber an opportunity to obtain further information about the resident.

21. The controlled-environment facility notification system of claim 17, wherein the one or more computer systems present the subscriber an offer to facilitate an action related to the change.

22. The controlled-environment facility notification system of claim 17, wherein a notification of the change for the resident and/or the change for the controlled-environment facility includes an indication of a former status of the resident and/or the controlled-environment facility and a new status of the resident and/or the controlled-environment facility.

23. The controlled-environment facility notification system of claim 17, wherein a notification of the change for the resident and/or the change for the controlled-environment facility includes at least one link to a website where more information about the resident and/or the controlled-environment facility may be obtained by the subscriber.

24. A tangible computer-readable storage medium having program instructions stored thereon that, upon execution by one or more controlled-environment facility computer systems, cause the one or more controlled-environment facility computer systems to:

accept identification, contact and any required payment information from a subscriber to establish a subscription to notifications about a particular resident of a controlled-environment facility and/or notifications about the controlled-environment facility, wherein the notifications that are available for subscription are determined based on an incarceration status of the resident;

determine, or receive an indication from one or more other controlled-environment facility computer systems, when information about the resident hosted by the same or one or more other controlled environment computer systems changes and/or when a change is made to information about the controlled-environment facility;

contact the subscriber; and notify the subscriber of the change during the contact or by directing the subscriber to a website.

* * * * *